(12) United States Patent
Day

(10) Patent No.: US 7,293,066 B1
(45) Date of Patent: Nov. 6, 2007

(54) METHODS AND APPARATUS SUPPORTING ACCESS TO STORED DATA

(75) Inventor: Mark Stuart Day, Milton, MA (US)

(73) Assignee: CISCO Technology, Inc., San Jose, CA (US)

( * ) Notice: Subject to any disclaimer, the term of this patent is extended or adjusted under 35 U.S.C. 154(b) by 516 days.

(21) Appl. No.: 10/761,652

(22) Filed: Jan. 21, 2004

(51) Int. Cl.
*G06E 15/167* (2006.01)

(52) U.S. Cl. .................. 709/213; 709/223; 709/232

(58) Field of Classification Search ............... 709/213, 709/232, 223
See application file for complete search history.

(56) References Cited

U.S. PATENT DOCUMENTS

| 6,233,389 | B1 | 5/2001 | Barton et al. ............... 386/46 |
| 6,526,581 | B1 | 2/2003 | Edson ........................ 725/74 |
| 6,789,106 | B2 | 9/2004 | Eyer et al. ................. 709/205 |
| 6,792,323 | B2 | 9/2004 | Krzyzanowski et al. ...... 700/90 |
| 6,792,615 | B1 | 9/2004 | Rowe et al. ................. 725/37 |
| 6,816,904 | B1 | 11/2004 | Ludwig et al. ............. 709/226 |
| 6,853,932 | B1 | 2/2005 | Wichelman et al. ......... 702/76 |
| 6,868,292 | B2 | 3/2005 | Ficco et al. ................. 700/19 |
| 6,874,089 | B2 | 3/2005 | Dick et al. ................. 713/201 |
| 6,880,171 | B1 | 4/2005 | Ahmad et al. ............. 725/134 |
| 6,993,508 | B1* | 1/2006 | Major et al. ................. 705/51 |
| 7,024,381 | B1* | 4/2006 | Hastings et al. ............. 705/26 |
| 2001/0036271 | A1* | 11/2001 | Javed ........................ 380/217 |
| 2002/0169656 | A1* | 11/2002 | Al-Azzawe ................. 705/10 |
| 2003/0079038 | A1* | 4/2003 | Robbin et al. ............. 709/232 |
| 2005/0038819 | A1* | 2/2005 | Hicken et al. ........... 707/104.1 |
| 2006/0053066 | A1* | 3/2006 | Sherr et al. ................. 705/26 |
| 2006/0149685 | A1* | 7/2006 | Gross ........................ 705/77 |

* cited by examiner

*Primary Examiner*—Zarni Maung
*Assistant Examiner*—Nghi V. Tran
(74) *Attorney, Agent, or Firm*—BainwoodHuang

(57) ABSTRACT

A data processing device, such as a television set top box, receives user-selected content data from a remote source over a network in response to user initiated content selection information. The data processing device stores the user-selected content data (e.g., readable or playable content data such as movies, text, audio, etc.) in an appropriate storage location of the data processing device. The data processing device enables a user to access only a portion of the user-selected content data stored therein. If the user forgoes a right to selectively retrieve certain content data, the data processing device enables user access to other user-selected content data in the storage location. Thus, if a user experiences a "change in heart," the user may forgo a right to play back certain content data for a right to selectively retrieve different portions of user-selected content data in the data processing device.

25 Claims, 10 Drawing Sheets

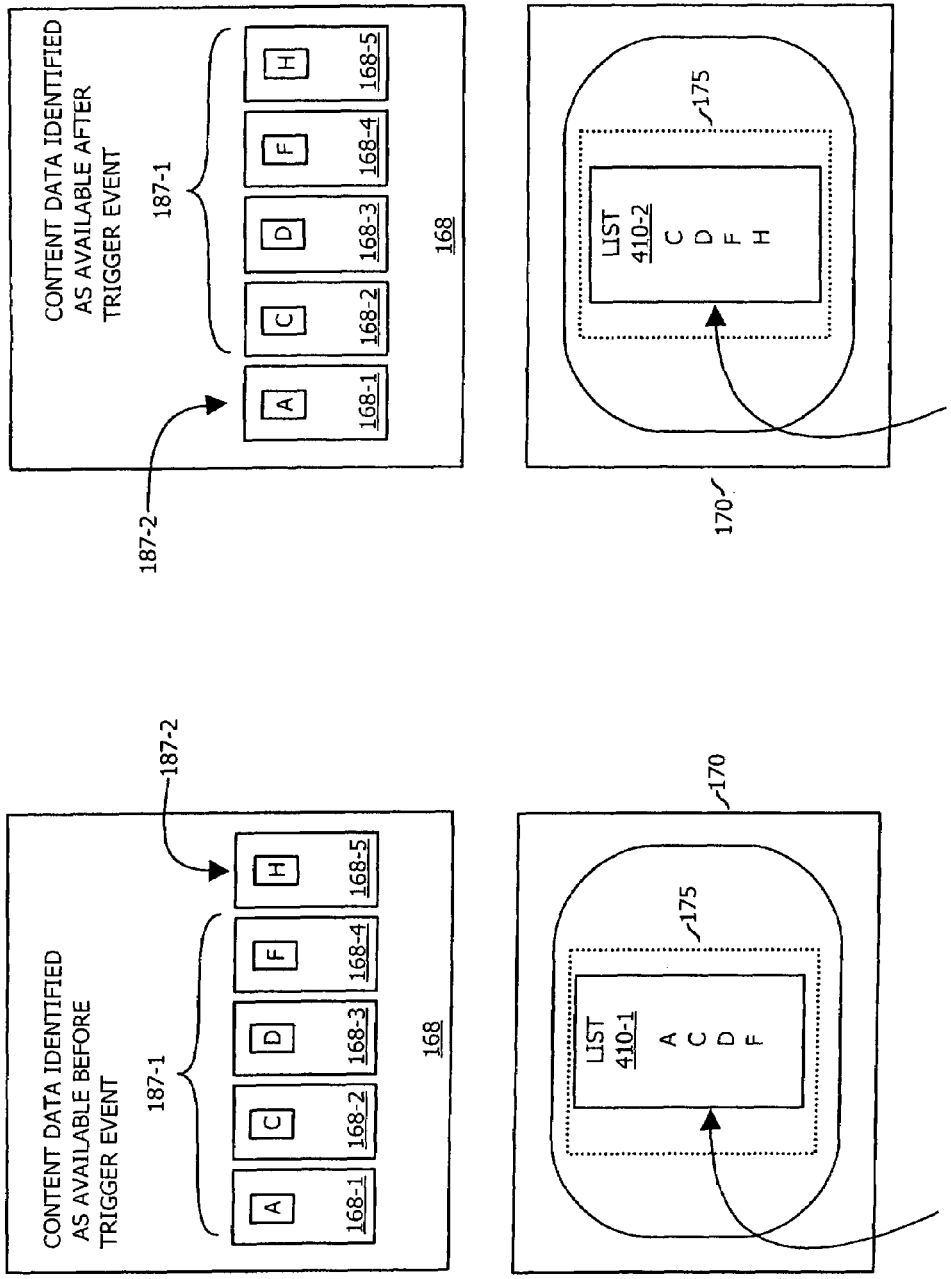

METHODS AND APPARATUS SUPPORTING ACCESS TO STORED DATA

BACKGROUND

Techniques for distributing information have evolved over time. For example, the introduction of the radio many years ago enabled people to receive broadcasted audio signals and listen to radio programs. Some time thereafter, the introduction of the television enabled people to receive broadcasted audio-video signals and view television programs.

Methods of distributing information have changed. Today, movies and other types of "playable" data are digitally encoded and distributed either physically on a medium such as a DVD (Digital Video Disc) or are distributed piece-meal over a network such as the Internet. Based on use of these modern day distribution techniques, users have much more flexibility where and when they watch a movie, listen to music, etc.

The demand for audio-video content is so great today that businesses associated with distribution of content data (e.g., audio information, video information, digital data information, etc.) have flourished. For example, Netflix® of Los Gatos, Calif. is a company that provides DVD rentals to its members via a mail service in lieu of self-help, in-person selection of DVDs at a local video store. In some respects, Netflix® offers a low-tech VoD (Video-on-Demand) alternative. Members of the service subscribe to a plan that allows them to rent as many movies as they want in a month, but they are entitled to no more than three at a time. For example, according to usage terms, at any given time, a member is allowed rental of only 3 movies—which includes any DVDs (i.e., movies) in transit from Netflix® to the member, any DVDs in possession of the member, and any DVDs in transit from the member to Netflix®. After a member watches a DVD and returns it via use of a postage-paid envelope, the company mails the member another DVD from a list of requested DVDs selected by the member and listed on a corresponding web page. This business model of distributing content data is so convenient that the average Netflix® customer watches five movies a month. Some subscribers may rent and watch twenty or more a month.

The demand for audio-video content is also so great today that businesses associated with general management (e.g., recording, playback, etc.) of content data have also flourished. For example, companies like TiVo® provide a service of managing recording and playback of video content distributed in real-time via wireless broadcast, cable, or satellite. More specifically, TiVo® provides technology and a supporting service for DVRs (Digital Video Recorders) that automatically record data. A DVR is similar in some respects to a VCR (Video Cassette Recorder), which records on magnetic tape. However, a DVR device instead utilizes a hard drive to store digital information for playback. Typically, the hard drive of a DVR digitally records up to 80 hours of subscriber's favorite shows automatically, without the hassles of videotape recording and playback.

Notably, the TiVo® service maintains a hidden storage space in the DVR used for storing advertisement content data and is filled independent of user requests. In other words, subscribers request what real-time content data is to be stored in the DVR for later playback but do not request retrieval or storage of the advertisement content data stored in the hidden storage space associated with the DVR. Upon playback of stored (i.e., requested) content data, the advertisements in the DVR are at least occasionally displayed to a subscriber. Subscribers of the TiVo® service sign an agreement acquiescing to this behavior of randomly displaying advertisements when playing back requested programs stored in the DVR.

SUMMARY

Conventional techniques of distributing and managing content data suffer from certain deficiencies. For example, according to the Netflix® model, delivery of content data depends on the laborious task of physically delivering DVDs between members and a central distribution center that manages mail service dissemination of the DVDs. Since there are postal charges associated with delivery, there is a high cost of delivering DVDs to members who view more than twenty a month. The company may ironically lose money on a particular member subscription because the cost of shipping and handling more than twenty DVDs in a month usually exceeds the member subscription price for that month.

Another deficiency of the content data mail delivery service model is that the member must physically package the DVD for mailing return a used a DVD back to a Netflix distribution center. Upon return of the DVD by the member, the distribution center receiving the returned DVD must physically handle the DVD and repackage it before sending it to another member. This cycle of handling, packaging, and repackaging the DVD is costly in terms of time and money and repeats itself many times during the life of the DVD as it is transferred from one member to another. A DVD may also be damaged by one member and cause an unsatisfactory viewing experience for the next member to use it. A service like Netflix must choose between an expensive check of each returned DVD or accepting a certain fraction of unhappy customers due to this problem.

Another deficiency associated with the conventional mail service delivery model is that once a DVD is placed in the mail for return, there is no way to retrieve it again if a member thereafter changes his mind and would like to view contents of the DVD again (or view the DVD for the first time if it has not yet been viewed). In order to get another copy of the same DVD returned in the mail, the member must wait for the returned DVD to be received at the distribution center (to which the DVD is mailed) in addition to the time it takes for the DVD to be shipped from the distribution center to the member again. If mailing incurs a delay of 2-3 days each way, a member may have to wait almost a week or more to re-obtain a DVD accidentally placed in the mail.

Another deficiency associated with the conventional mail service delivery model is the cost associated with the task of recording video data on DVDs. This cost may be quite substantial because the data distribution center requires many copies of the same movie (DVD) so that a common movie title can be delivered to and enjoyed by multiple members simultaneously. Note also that the DVD distribution center must be able to provide a warehouse for storage of the DVDs as well as provide a computer system to track their whereabouts. Thus, there are inefficiencies associated with this type of mail service delivery business model.

One conventional solution to distribute content data is VoD (Video-on-Demand), which alleviates the above mentioned deficiencies associated with the Netflix mail delivery service model. As its name suggests, VoD involves a process of serving real-time video data to a user requesting to view, for example, a movie. According to conventional VoD systems, a central repository of catalogued movies is made available to a potential user. In general, according to this conventional method, the user sends a request of a particular video for viewing to the central repository which, in turn, streams real-time data back over a network to the user for viewing. Unfortunately, streaming many different video data streams to many different users over a network requires highly complex network infrastructure capable of substantial bandwidth with high quality of service. It may take decades to establish such an infrastructure to make true VoD a viable delivery system for the majority of users.

Tivo® inserts non-user requested advertisements into selected content (e.g., in hidden content space) that a user must view before viewing a recorded program. This takes up a user's time because a user must view the advertisement even though the user did not request storage of the advertisements in the hidden space.

In contrast to the above-described conventional approaches of distributing content data, embodiments of the invention are directed towards queuing user-selected content data (such as movies) for viewing but a "hidden" or inaccessible storage space includes content data requested by a user rather than non-requested content data such as advertisements. For example, a television set top box device (associated with a corresponding user's television) includes a storage device for storing user-selected content data such as several movies or other viewable data. Assume for illustrative purposes that the set top box includes five slots (i.e., memory storage unit partitions), each of which can store one movie apiece. Content data stored in the slots may be selectively retrieved and played back for a user. To fill the slots of the set top box, the user sends selection information (request for content data) over a network to a request processing center that processes the selection information. In response to receiving requests for specific movies (or other types of readable or playable content data as identified in the selection information), the data center prompts a remote data server source (e.g., a content data server) to send content data associated with the user-selected movies for storage in the set top box. Initially, only the first four slots are filled with movies even though there are five slots available. Of course, the number of slots may vary depending on the application.

Assume that the slots for storing content data are initially empty. After the set top box retrieves and stores the content data (e.g., the set top box receives the first four user-selected movies and stores the movies in the first four slots), a graphical user interface associated with the set top box displays to the user that only the four downloaded movies (retrieved over a network such as the Internet) are available for viewing. Upon playback of a movie stored in a slot of the set top box (or based on the occurrence of some other trigger event), the set top box transmits a signal to the remote server for further downloading of content data. In response to the signal, the remote data server source fills the fifth slot with a fifth movie associated with previously received selection information associated with the user. Even though the fifth slot is filled with a movie, the graphical user interface marks only the first four fetched movies as being available for viewing by the user. Thus, even though the fifth slot may be filled, it is inaccessible to the user.

In order to be provided access to the movie in the fifth slot, the user has to pick one of the four available movies to "return." Choosing to return one of the available movies in the first four slots renders the newly-fetched fifth movie available and renders the "returned" movie unavailable. The set top box does not discard (or erase) the "returned" movie from a slot until the user starts playing one of the available four movies. This arrangement allows for a "change of heart" on the part of the user. For example, the user may choose to "return" movie #1 of the first four initially retrieved movies (e.g., movie #1, movie #2, movie #3, and movie #4) thus resulting in access to the movie #5 as well as "unreturned" movies such as movie #2, movie #3 and movie #4. Thereafter, a user may decide to return movie #5 in favor of being able to access and viewing movie #1 again. In such a case, the graphical user interface of the set top box enables user access to movie #1 (in lieu of movie #5) without having to re-fetch the previously-"returned" movie #1. Other embodiments of the above-described technique vary depending on the application. For example, rather than discarding a "returned" movie immediately when another movie is started, an embodiment might allow 10-15 minutes of "previewing", allowing the user to revert to a previously returned movie if the new one is not sufficiently appealing in that time.

In view of the specific embodiment discussed above, a general embodiment of the invention involves a technique of supporting access to stored information. A data processing device, such as a set top box device, receives user-selected content data from a remote source over a network in response to user-initiated content selection information. The data processing device stores the user-selected content data (e.g., readable data such as movies, text, audio, video, etc.) in an appropriate storage location such as a storage device associated with the data processing device. After storing the user-selected content data, the data processing device enables access (e.g., user access) to a first portion of the received user-selected content data in the storage location for selective retrieval, while disabling access to a second portion of the received user-selected content data in the storage location. Thus, even though a user selects both a first portion and second portion of content data for storage in the storage location (e.g. a storage device) of the data processing device, only a portion of user-selected content data is accessible for playback by a user. Storing more user-selected content data than a user may access prevents a user from being able to initially access too much data (stored in the data processing device) and, at the same time, allows for a change of heart if a user changes his mind and prefers access to previously "returned" user requested data content as discussed. In such a case, the previously "returned" user-selected content data will already be stored in the storage location for local retrieval again rather than having to repeat a process of retrieving the data from the remote source over the network.

Accordingly, embodiments of the invention are well-suited for partitioning a data storage device (of the data processing device) associated with a user to include multiple storage slots (e.g., a memory partition) for storage of a first portion of user-selected content data accessible to the user for playback. At least one storage slot of the storage device stores a second portion of user-selected content data inaccessible to the user. The user is not informed that the second portion of user-selected content data is stored in the storage device. Based on input from the user such as the act of deleting certain user-selected content available to the user, the data processing device enables the user to access the second portion of user-selected content data in lieu of enabling the user to access at least some of the first portion of user-selected content data in the storage device (i.e., storage location).

In further embodiments and yet other independent embodiments of the invention, the data processing device, such as a set top box, initially receives selection information from a user identifying particular user-selected content data for retrieval from the remote source over a network. In one application, the data processing device also receives input from the user specifying a time preferred for receiving the user-selected content data from the remote source for storage in a storage location associated with the user data processing device. Thus, a user may schedule viewing of content data to meet his/her needs. These time preferences may govern a time limit during which retrieved content data may be selectively retrieved, or a time constraint for receiving user selected content data over a network. Bandwidth constraints may govern the network bandwidth allocated in the network for receiving the user-selected content data.

The data processing device forwards the selection information over a network to a request processor that collects requests for content data from multiple users. In response to receiving the selection information at the request processor, the request processor prompts distribution of user-selected content data from the remote source to the storage location (such as the set top box) accessible by the user. The remote source may transmit the user-selected content data depending on the specified time so that the user receives content data prior to a requested time.

In one embodiment, the remote source transmits the user-selected content data via a non-real-time protocol to the user over a network. Thus, it may take several hours to receive content data that otherwise can be played back in real time, for example, in less than an hour. Transmitting in non-real time reduces bandwidth requirements of the network and associated devices supporting communication of the content data.

As mentioned, the data processing device associated with the user receives the user-selected content data from a remote source over a network (e.g., via a non-real-time data communication protocol) in response to a user-initiated content selection. A portion of user-selected content data may be received from the remote source in response to a user retrieving user-selected content data from the storage location associated with the user's processing device as previously discussed. For example, a user may view user-selected content data already stored in the storage location accessible to the user. According to arrangement, viewing (or retrieval) by the user may prompt the data processing device to send a signal to the remote source which, in response to receiving the signal, forwards additional user-selected content data over the network for storage in the storage location.

Upon receipt of content data at the data processing device, the data processing device stores the user-selected content data in a corresponding storage location. As mentioned, different portions of the user-selected content data may or may not be accessible by a user.

A graphical user interface associated with the data processing device provides notification to the user of only the portion of user-selected content data in the storage location that is available to the user for retrieval. For example, as discussed, a fifth movie may not be accessible by a user until after one of the first four movies in the storage location is "returned".

Through the graphical user interface, the data processing device provides access to a portion of the received user-selected content data in the storage location for selective retrieval. For example, a user may utilize the graphical user interface to identify which user-selected content data is available for selective retrieval and provide commands to playback such content data.

In response to receipt of a user playback command at the data processing device, the processing device transmits a stream of data associated with the user-selected content data in the storage location to a display device. Communication of the data may be achieved using a real-time data communication protocol so that a user may view user-selected content data played back in real-time. Generally, the data processing device communicates and displays content data such as video information on a display device such as a television, computer monitor, flat panel display screen, etc. Optionally, there may be other software or hardware players between the data processing device and the display screen. Such a player may provide transcoding of the content stream to different formats, transrating to shift bit rates up or down within a single format, content-sensitive pausing and fast-forwarding, or other control and formatting functions that may not available on the data processing device itself.

In one embodiment, note that the data processing device itself (potentially via the GUI or remote control device) may also support other control functions such as fast forward, rewind, fast play (e.g., faster than normal real-time playback of content data), slow play, stop, pause, etc. Thus, the data processing device may enable manipulation of content data similar to functions provided by a conventional VCR (Video Cassette Recorder) device.

In one embodiment, the data processing device (such as a set top box) receives at least a portion of user-selected content data via a non-real-time data communication protocol as mentioned. The data processing device stores the user-selected content data for retrieval by the user. In response to receipt of a user playback command, the data processing device transmits a data stream (such as a stream of real-time video data transmitted according to real-time data communication protocol) based on the user-selected content data stored in the storage location. For example, the data processing device may communicate the movie in real-time to a display device.

If the data processing device does not have the entire user-selected content requested by the playback command, and does not anticipate having the entire requested content by the time the absent portion is needed, then it can simply redirect or forward the stream so that the content is served directly from the remote source, in the same way as a "classic" VoD. If the data processing device does have the entire user-selected content requested by the playback command, or correctly anticipates having the entire requested content by the time the absent portion is needed, it can simply serve the content from the storage location. But if the data processing device incorrectly anticipates having the entire requested content by the time the absent portion is needed, it must continue serving the content past the locally-available portion.

While serving (or streaming) the user-selected content data to the display, the data processing device detects that a contiguous portion of data associated with the data stream is not stored in the storage location. For example, a user may view a movie that is only partially stored in the storage location. To support an uninterrupted display of content data on the display device, the data processing device may initially stream data from the data processing device. Thereafter, the data processing device relays the contiguous portion (e.g., portions of a movie not stored in the storage location) of data associated with the data stream to the display device via use of a real-time data communication protocol from the remote source instead of from a local storage location of the data processing device. Consequently, a user can play back and view a portion of user-selected content data served locally from the storage location of the data processing device while a second (contiguous) portion of user-selected content data is streamed in real time from the remote source. Thus, even though an entire movie is not stored locally in the data processing device, a user can still view the movie without interruption.

According to another embodiment of the invention, the data processing device generates a graphical user interface for displaying an itemized list of accessible data content in the storage location of the data processing device. The accessible data content can be selectively retrieved by a user for playback in real-time as discussed above.

In one arrangement, via the graphical user interface, the data processing device receives input from a user identifying a de-selected content item in the itemized list of available content data. In response, the data processing disables user access to the de-selected content item in the storage location. The data processing device then affords the user access to a different portion of user-selected content data in the storage location previously inaccessible to the user. For example, the set top box provides a user access to user-selected content data A, C, D, and F. The user may "return" or forgo the ability to view content data A. When the data processing device is programmed to enable access to a predetermined number of content data items, the data processing device enables the user to access other user-selected content data stored in the storage location. After "returning" user-selected content data A for obtaining the right to view, for example content data H stored in the data processing device, assume further that the user has a change of heart. For example, assume that a user decides to again have access to a previously "returned" user-selected content data such content data A. In such a case, the data processing device receives an indication from the user that that the user re-selects access to the de-selected content data A in lieu of content data H in the storage location of the data processing device. Based on this indication or input from the user, the data processing device enables user access to the de-selected content item (i.e., content data A) in lieu of the different portion of user-selected content data (i.e., content data H) in the storage location.

According to yet another embodiment of the invention, the remote source such as a content data server coupled to a network responds to user requests by serving user-selected content data.

For example, the request processor receives selection information over the network. The selection information identifies user-selected content data requested to be delivered to a corresponding data processing device (e.g., television set top box).

In one application, the request processor receives an optionally-prioritized list of preferred user-selected content data (e.g., the user generates a list of preferred content data) to be delivered for storage in the local data storage device of a remotely located set top box associated with the user. Note that the user-selected content data stored in the corresponding local storage device in one embodiment is only a subset of video data content identified in the optionally-prioritized list. For example, a user can request more content data than is actually allowed to be delivered for storage in the data processing device. In response to receiving the request for user-selected content data, the request processor prompts a data server device (e.g., a remote source) to transmit a portion of the user-selected content data identified in the selection information for storage in the corresponding local data storage device associated with the user's data processing device. As discussed, the amount of content data transmitted by the remote source to the user's data processing device may be more than the user is allowed to access and selectively playback on a display device. For example, the remote source may initially transmit video data content for storage in the local data storage device that the user is enabled to selectively playback and view. After detecting that at least a portion of the initially transmitted video data content in the local data storage device has been viewed by the user, the remote source or request processor (or a combination of both) prompts transmission of additional content for storage in the local data storage device. As discussed, the user is unable to view the additional video data content data in the set top box unless the user forgoes the ability to view at least a portion of the initially transmitted content data.

Other embodiments of the invention include execution of a software program on a computer system, or other device, configured with the software program and/or circuitry to process and perform all (or a portion thereof) of the method operations noted above and disclosed herein as embodiments of the invention. In such embodiments, the computer device, such as a personal computer, includes a memory unit (e.g., any type of computer readable medium, storage or memory system), a processor, a communication interface, a display interface, and an interconnect mechanism connecting the processor, display interface, communication interface, and the memory unit. In such embodiments, the memory system is encoded with an application or software program that causes the computer system to perform any part and/or all of the method embodiments, steps and operations explained herein as embodiments of the invention. In other words, a computer that is programmed or otherwise configured to operate as explained herein is considered an embodiment of the invention.

One embodiment of the present invention is directed to a computer program product that includes a computer readable medium having instructions stored thereon for supporting access to stored information as discussed. The instructions, when carried out by a processor of the data communication device (such as a set top box), cause the processor to perform the operations of: i) receiving user-selected content data from a remote source over a network in response to a user initiated content data selection; ii) storing the content data in a storage location associated with the data processing device; and iii) enabling access to a first portion subset of the received user-selected content data in the storage location for selective retrieval, while disabling access to a second portion of the received user-selected content data in the storage location. Other arrangements of embodiments of the invention that are disclosed herein include software programs to perform any of the method embodiment steps and operations summarized above and disclosed in detail below.

Embodiments of the invention may be implemented by computer software and/or hardware mechanisms within any type of computing apparatus. It is to be understood that the certain embodiments of the invention can be embodied strictly as a software program, as software and hardware, or as hardware and/or circuitry alone such in a content engine coupled to a network. The features of the invention, as explained herein, may be employed in data communications devices, computerized devices and/or software systems for such devices such as those manufactured by Cisco Systems, Inc. of San Jose, Calif.

Embodiments of the invention overcome deficiencies in the prior art. For example, embodiments of the invention avoid the need for a complex infrastructure supporting true video on demand while still providing user flexibility in selecting and viewing stored content data. For example, embodiments of the invention include hidden slots for storage of user-requested content data as opposed to non-requested data such as advertisements.

Embodiments of the invention also overcome deficiencies associated with renting DVDs based on use of a subscription-based mail delivery service. For example, according to principles of the present invention, users may incrementally and automatically fetch data for storage in their television set top box without having to physically handle a DVD. Thus, utilization of slots for storing user-selected content data retrieved over a network: i) alleviates physical delivery charges associated with hand delivering content data on DVDs, ii) eliminates a cost associated with general DVD handling, iii) eliminates loss or damage to DVDs because information is instead transmitted over a network, iv) alleviates a need to track whereabouts of many rented DVDs, v) enables instantaneous swapping of accessible user-selected data, and vi) enables a user to "undo" a content data "return" decision without having to wait several days for access to "returned" content data. Other advantages will be apparent from the following text and associated figures identifying more specific details of embodiments of the invention.

BRIEF DESCRIPTION OF THE DRAWINGS

FIG. 4A is a diagram illustrating user-selected content data available before a trigger event according to an embodiment of the invention.

FIG. 4B is a diagram illustrating user-selected content data available after a trigger event according to an embodiment of the invention.

Figure 1:
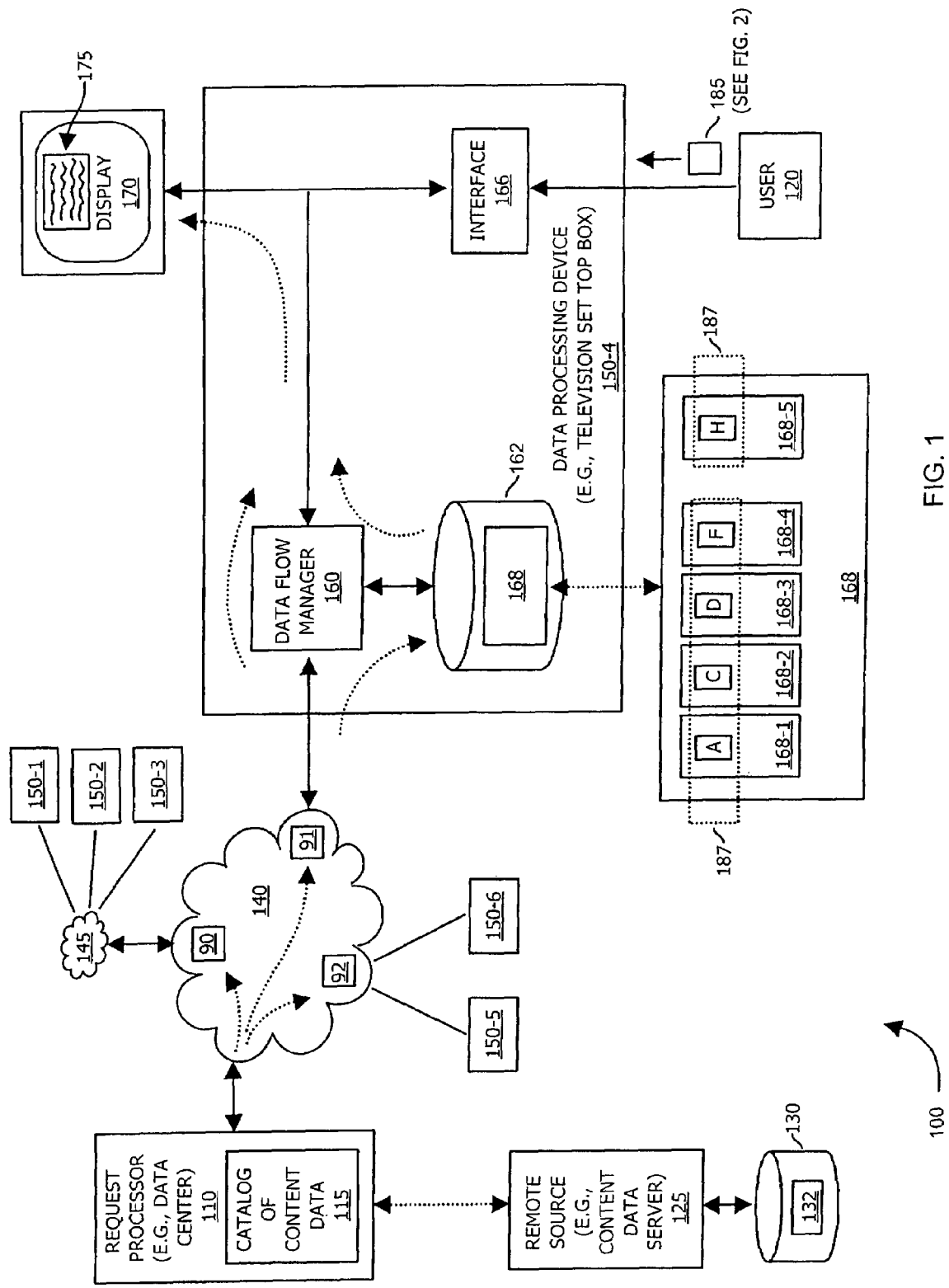
FIG. 1 is a diagram of a communication system supporting access to stored content data according to an embodiment of the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF EMBODIMENTS

Embodiments of the invention are directed towards storage of user-selected content data (such as movies, music, text, etc.) for playback. In the context of a movie storage application, a storage device store content data hidden from the user. For example, a television set top box (associated with a corresponding user's television) includes a storage device for storing user-selected content data such as several movies or other playable data. Assume for illustrative purposes that the set top box includes five slots (i.e., memory storage unit partitions), each of which can store one movie apiece. Content data stored in the slots may be selectively retrieved and played back for a user.

To fill the slots of the set top box (e.g., an electronic device coupled to a user's television set), the user sends selection information over a network to a request processing center that processes such requests. In response to receiving the request for the specific movies (or other types of readable or playable content data), the data center prompts a remote data server source (e.g., a content data server) to send (via a non-real-time protocol) content data associated with the user-selected movies for storage in the slots of the set top box. Alternatively, the data center can provide a result or redirection identifying the remote data server source to the set top box, so that the set top box requests the content directly from that source. Initially, only the first four slots of the set top box are filled with movies even though there are five slots. Of course, the number of slots in the device may vary depending on the application, and in some applications the number of slots available may depend on attributes of the content being stored.

Assume that slots for storing content data are initially empty. After retrieval and storage of content data such as the first four user-selected movies in the first four slots in the set top box, a graphical user interface associated with the set top box displays to the user that only the four downloaded movies (retrieved over a network such as the Internet) are available for playing back on a playback device (e.g., a display device, speaker, etc.) for viewing and/or listening. Upon playback of a movie stored in the slots of the set top box (or based on the occurrence of some other trigger event), the set top box transmits a signal to the remote server. In response to the signal, the remote data server source fills the fifth slot of the slots with a fifth movie. Even though the fifth slot is now filled with a movie, the graphical user interface marks only the first four fetched movies as being available for viewing by the user. Thus, it is possible to reach a state in which the fifth slot has been filled, but it is inaccessible to the user. The user may not be provided notification whether the fifth slot is filled or not.

In order to be provided access to the movie in the fifth slot, the user has to pick one of the four available movies to "return." Choosing to return one of the available movies in the first four slots renders the newly-fetched fifth movie available and renders the "returned" movie unavailable. The set top box does not discard (or erase) the "returned" movie from a slot until the user starts playing one of the four available movies. This arrangement allows for a change of heart. For example, the user may choose to "return" movie #1 of the first four initially retrieved movies (e.g., movie #1, movie #2, movie #3, and movie #4) thus resulting in access to the movie #5 as well as "unreturned" movies such as movie #2, movie #3 and movie #4. A user may thereafter decide to return movie #5 in favor of being able to access and viewing movie #1 again. In such a case, the graphical user interface of the set top box enables user access to movie

1 (in lieu of movie #5) without having to re-fetch the previously-"returned" movie #1. Other embodiments incorporating the above-described techniques vary depending on the application.

FIG. 1 is a diagram of a communication system 100 supporting access to stored information according to an embodiment of the invention. As shown, communication system 100 includes request processor 110, remote source 125, storage device 130, network 140 (e.g., a wide area network), network 145 (e.g., a local area network), data processing devices 150-1, 150-2, . . . , 150-6, (collectively data processing devices 150 such as set top boxes). Request processor 110 stores a catalog of content data 115 (e.g., accessible web page information identifying potentially retrievable content data) while storage device 130 stores content data 132. Network 140 includes distribution node 90, distribution node 91, and distribution node 92 for distributing data. Data processing device 150-4 includes data flow manager 160, storage device 162 and corresponding storage locations 168, and interface 166. User 120 generates selection information 185. Storage device 162 includes storage location 168-1, storage location 168-2, . . . , storage location 168-5 (collectively storage locations 168) for storing user-selected content data 187-1 and user-selected content data 187-2 (collectively user-selected content data 187). Data processing device 150-4 communicates with display 170 for displaying graphical user interface 175 to user 120.

In general, communication system 100 enables user 120 to access content data 132 stored in storage device 130 over network 140. For example, to initiate retrieval of content data 132 such as readable or playable information, user 120 provides selection information 185 through interface 166 (e.g., a keyboard, mouse, remote control device, etc.). Graphical user interface 175 on display 170 provides a mechanism for the user 120 to generate selection information 185 such as a list of content data to be retrieved from remote source 125. Note that in one embodiment, the user 120 accesses and views catalog of content 115 to identify potentially available content data 132 for delivery and storage in data processing device 150-4. The catalog of content 115 could also consist of references to content data 132 available on multiple remote sources 125. Additionally, such a catalog of content 115 could consist of one or more pages of dynamically-generated results from a user query, such as could be produced by a search engine like those offered by Google, Inc. Based on content data identified in the catalog of content data 115 as viewed by user 120 via graphical user interface 175, the user 120 generates selection information 185 (e.g., selects content data to be received).

Data processing device 150-4 receives the selection information 185 generated by the user 100 and forwards it across network 140 to request processor 110. In the context of a networking application according to an embodiment of the invention, selection information 185 as well as other transmitted and received information is conveyed through networks 140, 145 (e.g., wide area networks and/or local area networks) and communication system 100 in general via use of a packet-switching protocol such as TCP/IP (Transmission Control Protocol/Internet Protocol).

Upon receipt of selection information 185 and optional consideration of previously-received selection information 185 from other users, request processor 110 determines what portion, if any, of requested content data, as identified in the selection information 185, for retrieval from storage device 130 and delivered for storage in storage device 162 of data processing system 150-4. After request processor 110 determines what content data to forward based on selection information 185, request processor 110 prompts remote source 125 to retrieve appropriate content data 132 from storage device 130 and sends content data 132 over network 140 through data flow manager 160 for storage in storage device 162 and, more particularly, in storage locations 168 of storage device 162.

Figure 2:
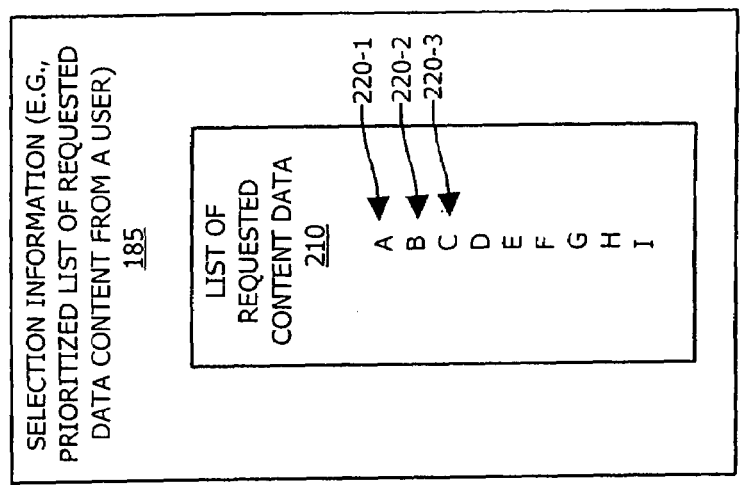
FIG. 2 is a diagram illustrating selection information identifying a list of user-selected content data according to an embodiment of the invention.

FIG. 2 is a diagram illustrating selection information 185 identifying a list of requested content data 210 according to an embodiment of the invention. As shown, user 120 (in FIG. 1) identifies that he wishes to retrieve content data A, B, C, D, E, F, G, H, and I (e.g., nine different movies). In one arrangement, the list of requested content data 210 may be prioritized such that a first entry 220-1 identifies (if available) content data that the user 120 desires to be delivered first, a second entry 220-2 identifies content data that the user 120 desires to be delivered second, a third entry 220-3 identifies content data that the user 120 desires to be delivered third, and so on.

It should be noted that request processor 110 may not deliver certain requested content data based on low overall demand by multiple users for particular content data 132. For example, in one embodiment, request processor 110 prompts delivery of only the most commonly requested content data by multiple users. Insufficiently popular content may be handled by other means such as direct streaming from the remote source, and/or may require the user to pay an additional charge unless enough other users also request the same content within a particular time interval. Consequently, user 120 may receive only a portion of the requested content data as identified in list of requested content data 210. For example, in the case as shown, user 120 requests to receive A, B, C, D, E, F, G, H, and I but remote source 125 only delivers content data A, C, D, F, and H (see FIG. 1) for storage in respective storage locations 168-1, 168-2, 168-3, 168-4, and 168-5. Content data B, E, and G may not be available for transmission to user 120. Note that in one embodiment, remote source 125 does not forward content data H for storage in storage location 168-5 until user 120 starts playing back (e.g., viewing) one of content data A, C, D, or F on display 170 (i.e., a playback device such as a viewing screen, sound system, etc.). Note that in the context of a music application, communication system 100 optionally includes a different type of playback device in lieu of display 175 for playing back stored music content data instead of playing video data.

Referring again to FIG. 1, request processor 110 and remote source 125 provide delivery of content data 132 to multiple users according to an embodiment of the invention. For example, request processor 110 receives requests from corresponding users at respective data processing systems 150. In response to receiving the requests, request processor 110 prompts remote source 125 to transmit appropriate content data 132 over network 140 to users for viewing on respective display 170 such as a television. In one application, assume that corresponding users at data processing devices 150-1 and 150-2 request to view the same movie. In this case, remote source 125 generates a single stream of user-selected content data (e.g., a particular movie) to respective distribution node 90. Distribution node 90, in turn, distributes the particular movie to multiple data processing systems 150 by forwarding the movie as multiple separate data packet streams to each of the data processing devices 150-1 and 150-2 associated with the requesting users. If distribution node 90 has sufficient resources, it can not only forward the packet streams but actually store a local copy of the particular movie. After distribution node 90 has a full copy of that movie, request processor 110 can treat distribution node 90 as effectively another remote source 125 for that movie, and can redirect subsequent requesting data processing devices 150 to retrieve that movie from distribution node 90. This technique reduces overall congestion in network 140 because remote source 125 transmits only a single stream to, for example, distribution node 90 which, in turn, duplicates the stream and sends it to requesting users such as those at corresponding data processing systems 150-1 and 150-2. In light of the foregoing discussion, additional embodiments and features of the invention will be discussed with respect to flowchart 300 in FIG. 3. Note that flowchart 300 describes a method for execution by data processing device 150-4.

Figure 3:
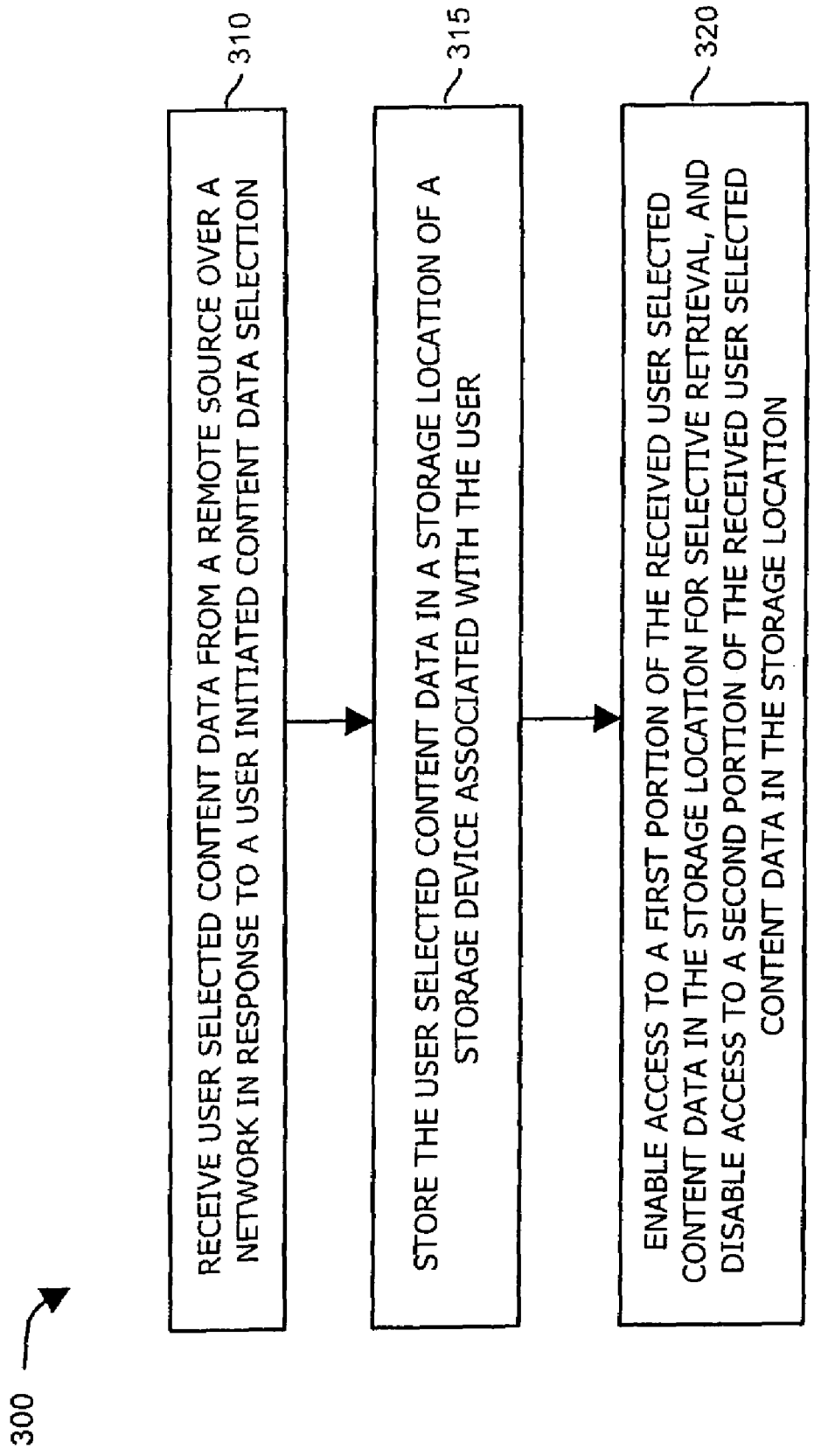
FIG. 3 is a flowchart illustrating a method of receiving user-selected content data and providing access to a portion of stored user-selected content data according to an embodiment of the invention.

FIG. 3 is a flowchart 300 illustrating a method of receiving user-selected content data 187 and providing access to a portion of stored user-selected content data 187 according to an embodiment of the invention.

In step 310, data processing device 150-4 (e.g., a television set top box) receives user-selected content data 187 from the remote source 125 (e.g., a content data server) over network 140 in response to user initiated content selection information 185.

In step 315, the data processing device 150-4 stores the user-selected content data 187 (e.g., readable user-selected content data A, C, D, F and H such as movies, text, audio, video, etc.) in appropriate storage locations 168 of storage device 162 associated with data processing device 150-4.

After storing the user-selected content data 187, following in step 320, the data processing device 150-4 enables access (e.g., user access) to a first portion of the received user-selected content data 187-1 (e.g., content data A, C, D, and F) in respective storage locations 168-1, 168-2, 168-3, and 168-4 for selective retrieval. At the same time, data processing device 150-4 disables access to a second portion of the received user-selected content data 187-2 (e.g., content data H) in the storage location 168-5. Thus, even though a user selects both a first portion and second portion of content data for storage in the storage locations 168 of the data processing device 150-4, only a portion of user-selected content data 187-1 is accessible for playback by a user 120. Storing more user-selected content data 187 than a user 120 may access allows for a "change of heart" if a user 120 initially "returns" content data A for the option of viewing content data H instead and later changes his mind and prefers access to content data A again in lieu of content data H. This is more particularly discussed in relation to FIGS. 4A and 4B.

FIG. 4A is a diagram illustrating user-selected content data 187-1 accessible by the user 120 before occurrence of a trigger event according to an embodiment of the invention. More specifically, as shown, display 170 includes graphical user interface 175 identifying a list 410-1 of retrievable user-selected content data 187-1 (e.g., content data A, C, D, and F) prior to occurrence of a trigger event such as a user 120 "returning" a movie such as content data A. As shown, the data processing device 150-4 provides notification of only the portion of user-selected content data that is available for retrieval. Thus, prior to occurrence of the trigger event, the user may selectively retrieve and view content data A, C, D, and F in respective storage locations 168-1, 168-2, 168-3 and 168-4.

FIG. 4B is a diagram illustrating user-selected content data 187-1 accessible by the user 120 after occurrence of a trigger event according to an embodiment of the invention. More specifically, as shown, display 170 includes graphical user interface 175 identifying a list 410-2 of accessible user-selected content data 187-1 retrievable from storage locations 168 (e.g., content data C, D, F, and H) after the occurrence of a trigger event such as a user 120 "returning" or "de-selecting" a movie such as content data A. Thus, after occurrence of the trigger event, user may selectively view content data C, D, F and H. Note that user-selected content data A may be deleted (or access may be denied) after a predetermined elapsed amount of time (e.g., a configurable delay dictates when content data in an itemized list is no longer available to the user 120). For example, data processing device 150-1 may delete stored content data that has already been viewed (i.e., played back) and/or content data that has been hidden in storage device 162 for more than two days. As discussed, prior to deletion of content data A, the user 120 can have a "change of heart" and decide to re-select content data A for viewing in lieu of content data H. In this instance, data processing device 150-4 again makes content data A, C, D, and F accessible to the user 120 and content data H inaccessible to the user 120. If the user 120 wishes to have both content data A and content data H accessible at the same time, the user 120 can change the choices or priorities in the selection information 185, or can mark one of C,D,F to be returned. The content data 187 available to the user 120 is an unordered window on the whole queue, set, or partially ordered list of content data indicated by selection information 185.

Figure 5A:
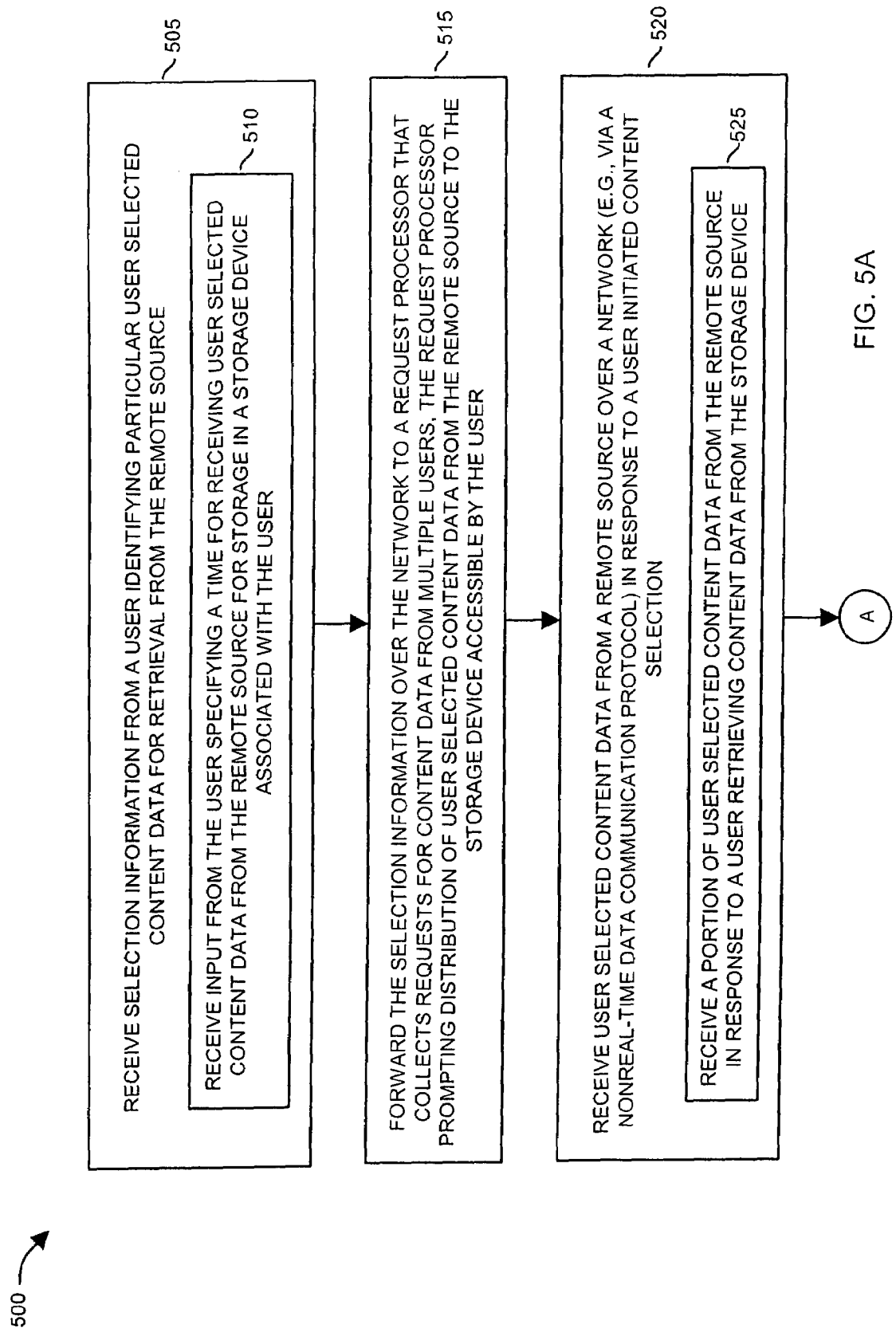
FIGS. 5A and 5B combine to form a flowchart illustrating a method of supporting user access to content data according to an embodiment of the invention.
Figure 5B:
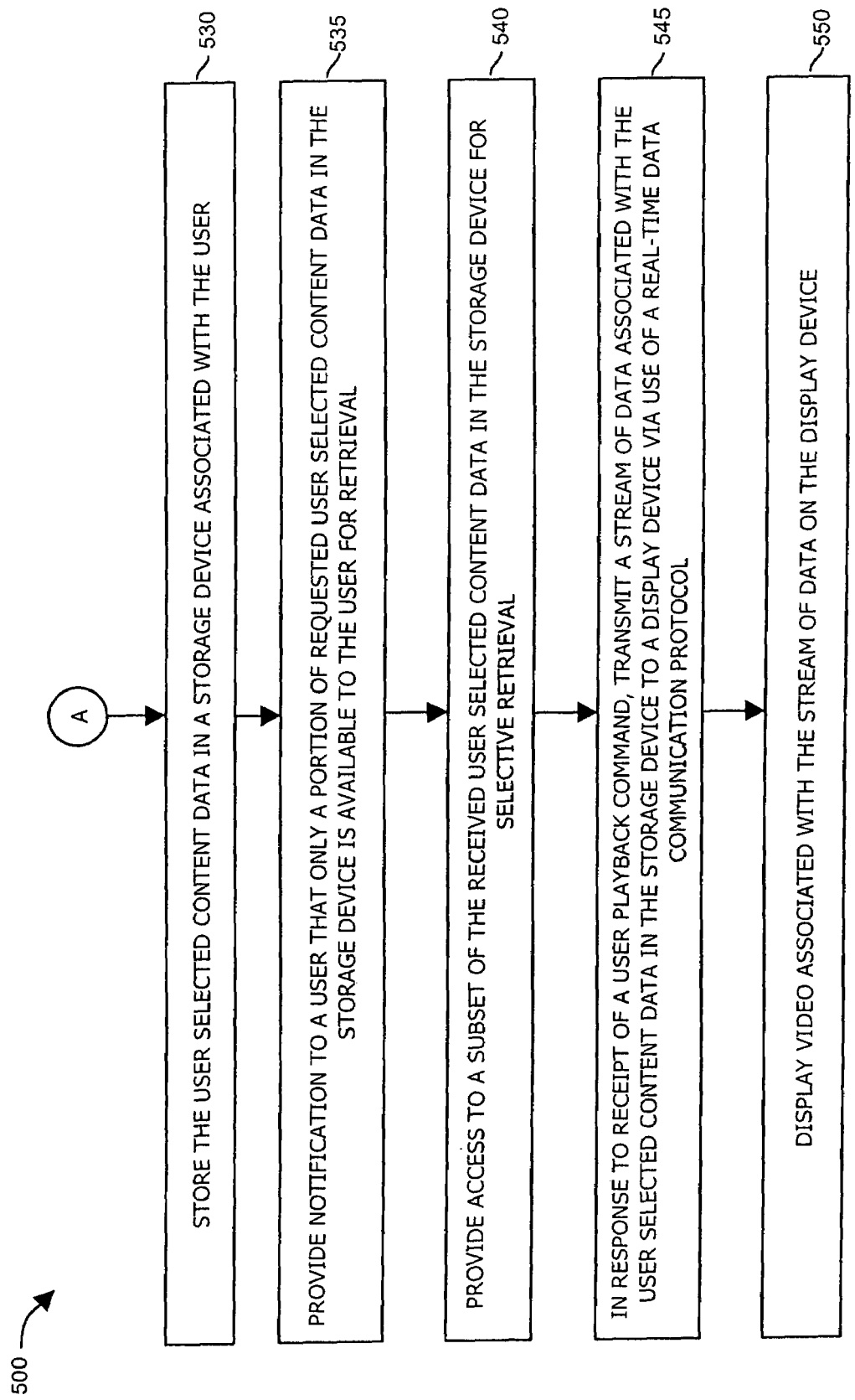

FIGS. 5A and 5B combine to form a flowchart 500 illustrating a more specific method of supporting user access to user-selected content data 187 according to an embodiment of the invention. As mentioned, FIG. 3 discusses a general embodiment of the invention, whereas FIGS. 5A and 5B discuss a more detailed embodiment of the invention. Thus, there is some overlap with respect to a discussion for each of these embodiments.

As shown in flowchart 500, in step 505, the data processing device 150-4 such as a set top box initially receives selection information 185 from the user 120 identifying particular content data 132 for retrieval from remote source 125 over network 140. In one application, as shown in step 510, the data processing device 150-4 also receives input from the user 120 specifying a preferred time for receiving the selected content data 132 from the remote source 125 for storage in storage locations 168 associated with user 120.

In step 515, data processing device 150-4 forwards the selection information 185 provided by user 120 over network 140 to request processor 110 which collects requests for content data from multiple users. In response to receiving the selection information 185 at the request processor 110, the request processor 110 prompts distribution of certain content data 132 from the remote source 125 to at least some of the storage locations 168 accessible by the user 120, possibly via one or more distribution nodes 90. The remote source 125 communicates the user-selected content data 187 depending on the specified time so that the user 120 receives selected content data prior to a requested time. For example, a user may request delivery of selected content data by Saturday at 6:00 p.m.

In one embodiment, the remote source 125 transmits the content data 132 from storage device 130 via a non-real-time protocol to the user 120 over network 140. Thus, it may take several hours to receive content data 132 such as a movie that plays back in under two hours when played back in real-time. Transmitting in non-real-time reduces bandwidth requirements of network 140 and associated devices that support transmission of the content data 132 to user 120. Additionally, transmitting in non-real-time allows for transmissions to be scheduled for smoother utilization of the network, shifting transmission away from peak usage times and into non-peak usage times.

In step 520, the data processing device 150-4 associated with the user 120 receives the user-selected content data 187 from the remote source 125 over the network 140 (e.g., via a non-real-time data communication protocol) in response to a user 120 initiated content selection such as forwarding selection information 185 to request processor 110. A portion of user-selected content data 187-2 may be received from the remote source 125 in response to a user 120 retrieving user-selected content data 187-1 from the storage location 168-1. For example, a user 120 may view user-selected content data A already stored in the storage location 168-1 accessible to the user 120. Viewing (or retrieval) of content data A by the user 120 prompts the data processing device 150-4 to send a signal to the remote source 125 which, in turn, forwards additional user-selected content data H over network 140 for storage in storage location 168-5.

In step 530, upon receipt of content data 132, the data processing device 150-4 stores the user-selected content data 187 in storage locations 168. As mentioned, limited portions of the user-selected content data 187 are accessible by a user 120.

Graphical user interface 175 includes status information regarding what user-selected content data 187 in the storage location 168 is available to the user 120. For example, in step 535, the graphical user interface 175 associated with the data processing device 150-4 provides notification to the user 120 to the portion of user-selected content data 187 stored in storage device 162 available to the user 120 for retrieval. For example, as discussed in connection with FIGS. 4A and 4B, a fifth movie (such as content data H) may not be accessible until after the user 120 "returns" one of the first four movies (such as content data A, C, D and F) stored in storage device 162. Thus, graphical user interface 175 initially notifies user 120 that only content data A, C, D and F are stored in storage device 162.

In step 540, through the graphical user interface 175, the data processing device 150-4 provides user access to a portion of the received user-selected content data 187-1 in storage device 162 for selective retrieval. For example, the graphical user interface 175 identifies that user-selected content data 187-1 is available for selective retrieval and playback.

In step 545, in response to receipt of a user playback command at the data processing device 150-4 based on a user commanding playback via input through the graphical user interface 175, the data processing device 150-4 transmits a stream of data associated with the user-selected content data 187 (such as content data A) in storage device 162 to display 170.

In step 550, in response to receiving a playback command issued by user 120 through graphical user interface 175, the data processing device 150-4 communicates content data to display 170 (e.g., a television, computer monitor, flat panel display screen, etc.). Thus, display 170 displays video images in response to the stream of data associated with stored content data 187-1.

Note that the data processing device 150-4 also supports other control functions such as fast forward, rewind, fast play (e.g., faster than normal real-time playback of content data), slow play, stop pause, etc. as provided by user 120. Thus, data processing device 150-4 enables user manipulation of data similar to standard functions provided by a conventional VCR device.

Figure 6:
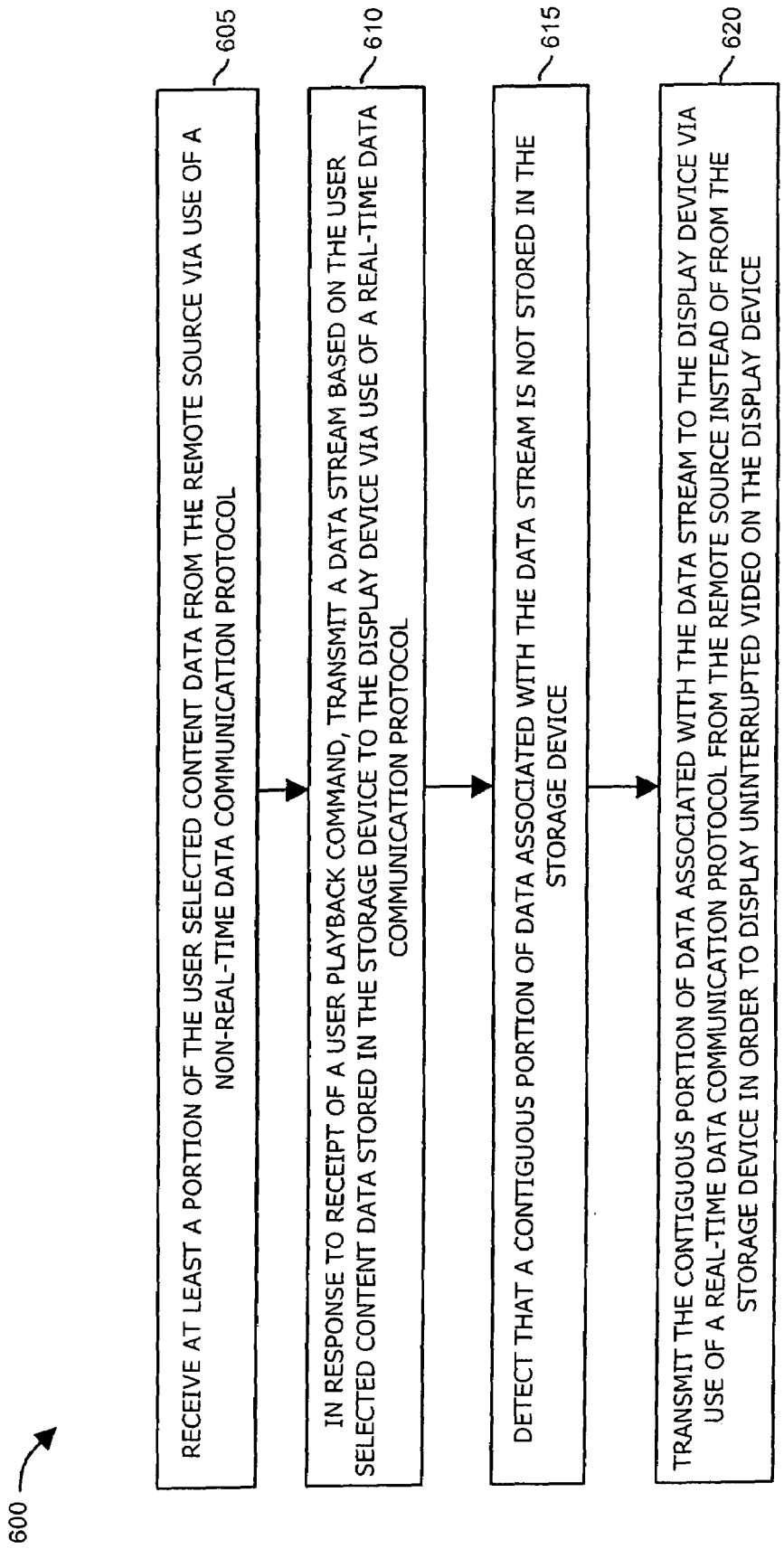
FIG. 6 is a flowchart illustrating a method of switching over from real-time transmission of user-selected content data from a local storage device to real-time transmission of user-selected content data from a remote source according to an embodiment of the invention.

FIG. 6 is a flowchart 600 illustrating a method of switching over from real-time transmission of user-selected content data 187 in storage device 162 to real-time transmission of content data 132 from a remote source 125 according to an embodiment of the invention. This switchover process enables uninterrupted viewing of video information.

In step 600, the data processing device 150-4 such as a set top box receives at least a portion of the user-selected content data 187 via a non-real-time data communication protocol as mentioned. The data processing device 150-4 stores the user-selected content data in storage device 162. In response to receipt of a user playback command, the data processing device 150-4 transmits a data stream (such as a stream of real-time video data transmitted according to real-time data communication protocol) based on the user-selected content data stored in a storage location 168 of storage device 162. For example, the data processing device communicates (such as content data A) a movie stored in storage device 162 in real-time to display device 170.

In step 615, while serving (or streaming) the user-selected content data 187 to display 170, the data processing device 150-4 detects that a next contiguous portion of data is not stored in storage location 168-1. For example, a user 120 may be viewing a movie that is only partially stored in the storage location 168-1. To support an uninterrupted display of content data on the display 170, the data processing device 150-4 switches over from delivering content data from storage location 168-1 to delivery content data 132 from remote source 125 (through data processing device 150-4). Data flow manager 160 manages the switchover process. Consequently, the user 120 may playback and view a portion of user-selected content data 187-1 served locally from the storage location 168-1 while a second (contiguous) portion of user-selected content data 187 is relayed from the remote source 125 (via a real-time communication protocol) through data processing device 150-4 to display 170. Thus, even though an entire movie is not be stored locally in the data processing device 150-4, a user can still view a movie without interruption using this switchover method.

Figure 7:
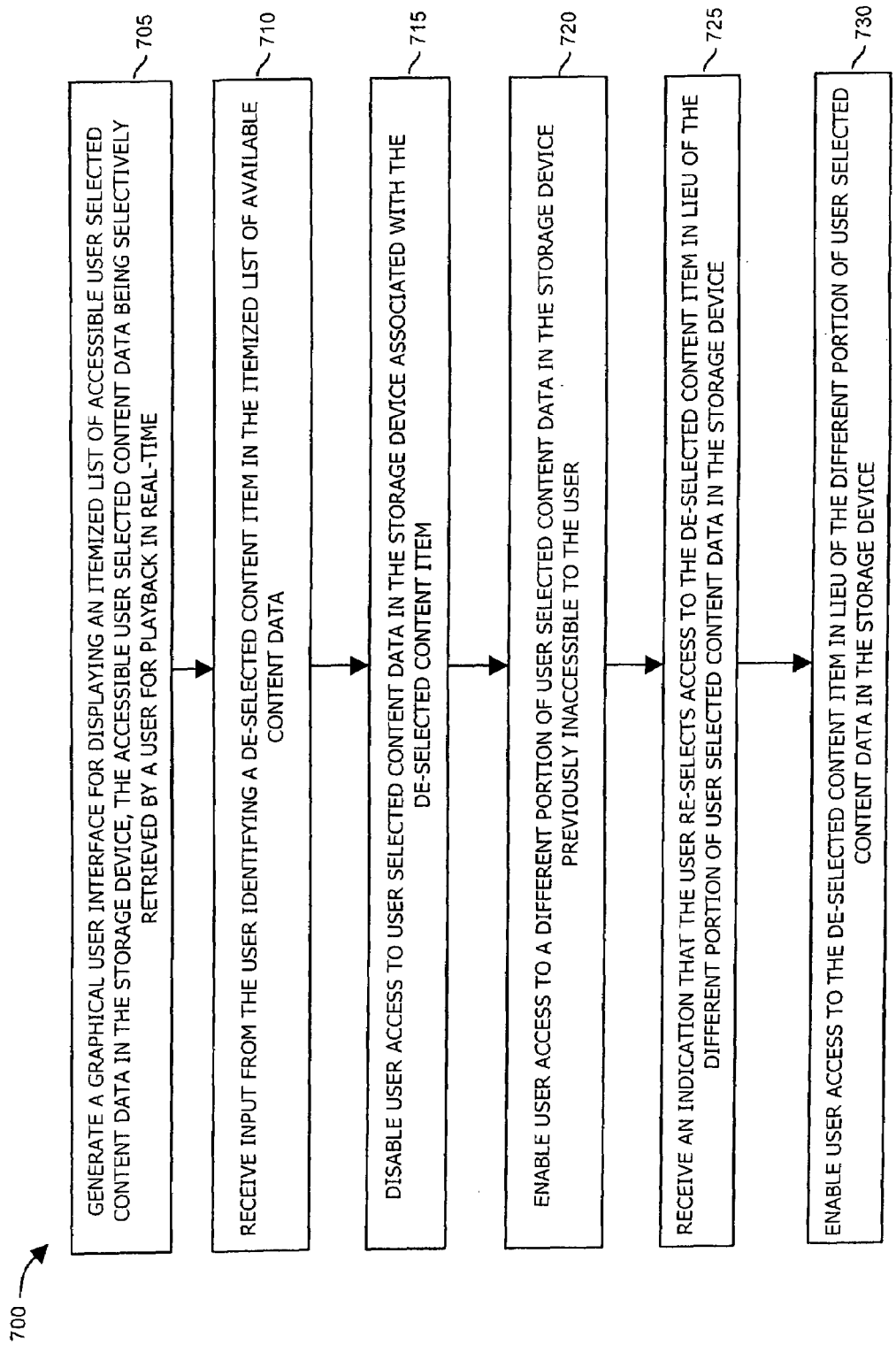
FIG. 7 is a flowchart illustrating a method of enabling access to different portions of user-selected content data according to an embodiment of the invention.

FIG. 7 is a flowchart 700 illustrating a method of enabling access to different portions of user-selected content data 187 according to an embodiment of the invention.

In step 705, the data processing device 150-4 generates a graphical user interface 175 for displaying an itemized list 410 of accessible content data 187-1 in storage locations 168 of storage device 162. User 120 selectively retrieves user-selected content data 187-1 for playback in real-time as discussed above.

In step 710, via the graphical user interface 175 (e.g., a touch screen application), the data processing device 150-4 receives input from a user 120 identifying a de-selected content item in the itemized list of available content data. In other words, the data processing device 150-4 receives input from user 120 identifying which user-selected content data 187-1 the user 120 would like to return.

In step 715, in response to receiving the input identifying the deselected content item in the last step, the data processing device 150-4 disables user 120 access to the de-selected content item such as content data A. Thus, graphical user interface 175 no longer indicates that content data A is stored or available in storage device 162.

In step 720, the data processing device 150-4 enables user 120 access to a different portion of user-selected content data 187 in the storage device 162 previously inaccessible to the user 120. For example, a user 120 may initially be provided access to user-selected content data 187-1 A, C, D, and F. The user 120 may "return" or forgo the right to view content data A in storage location 168-1. Because data processing device 150-4 enables access to a predetermined number (such as four) of content data items, the data processing device 150-4 enables the user 120 access to other user-selected content data 187 such as content data H. In this case, based on the "return" of content data A, data processing device 150-4 makes content data C, D, F, and H accessible to the user 120 instead of content data A, C, D, and F.

Figure 8:
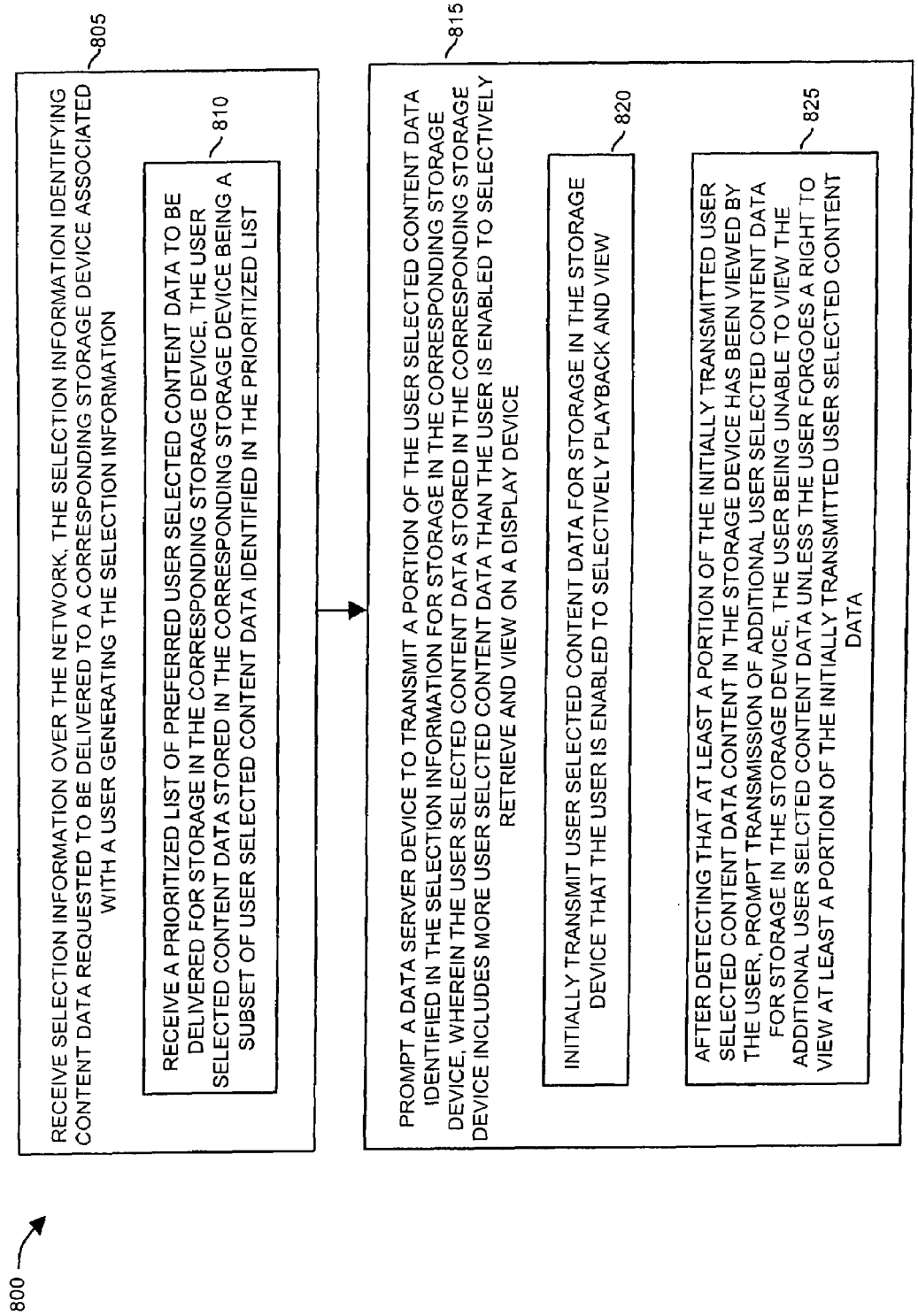
FIG. 8 is a flowchart illustrating a method of processing requests and forwarding user-selected content data according to an embodiment of the invention.

After "returning" user-selected content data A, the user 120 may have a change of heart. For example, a user 120 may decide to again have access to a previously "returned" user-selected content data 187 such as content data A. In such a case, in step 725, the data processing device 150-4 receives an indication from the user 120 that the user 120 re-selects access to the de-selected content A again in lieu of being able to access content data H. In step 730, based on the "change of heart" (e.g. "back" or "cancel") input from user 120, the data processing device 150-4 enables user 120 access to previously de-selected content data A in lieu of the different portion of user-selected content data H in storage device 162. FIG. 8 is a flowchart 800 illustrating a method of processing user selection requests and forwarding user-selected content data 187 from the perspective of request processor 110 and remote source 125 according to an embodiment of the invention.

In step 805, the request processor 110 receives selection information 185 over network 140 from user 120. The selection information 185 identifies content data 132 requested by user 120 for delivery to data processing device 150-4 (e.g., television set top box) and, more specifically, storage device 162 associated with a user 120 generating the selection information 185.

In step 810, the request processor 110 receives a prioritized list of requested content data 210 (e.g., as in FIG. 2, the user 120 generates a list 210 of content data for delivery). As discussed, the user-selected content data 187 stored in the corresponding local storage device 162 is only a subset of content data identified in the prioritized list 210. For example, a user 120 may request content data A, B, C, D, E, F, G, H, and I. However, user 120 may be limited to retrieving only a portion of this user-selected content data such as content data A, C, D, and F.

In step 815, in response to receiving the request for content data 132, the request processor 110 prompts remote source 125 to transmit a portion of the user-selected content data 187 identified in the selection information 185 for storage in the corresponding storage device 162 associated with the user 120. As discussed, the amount of content data transmitted by the remote source 125 to the user's data processing device 150-4 may be more than the user 120 is allowed to access and selectively play back on display 170. Thus, in step 820, the remote source 125 initially transmits content data (such as content data A, C, D, and F) for storage in the local data storage device that the user 120 is enabled to selectively playback and view on display 170.

In step 825, after detecting that at least a portion of the initially transmitted video data content in the local data storage device 162 has been viewed by the user 120, the remote source 125 or request processor 110 (or a combination of both) prompt transmission of additional content data for storage in storage device 162. For example, after viewing content data A, data processing device 150-4 generates a signal to remote source 125 for delivery of content data H for storage in storage location 168-5 of storage device 162. Similarly, after viewing content data B, the slot that was occupied by A will be filled with the next content data indicated by selection information 185, subject to any priorities expressed in selection information 185 and the availability of the highest-priority content indicated.

Figure 9:
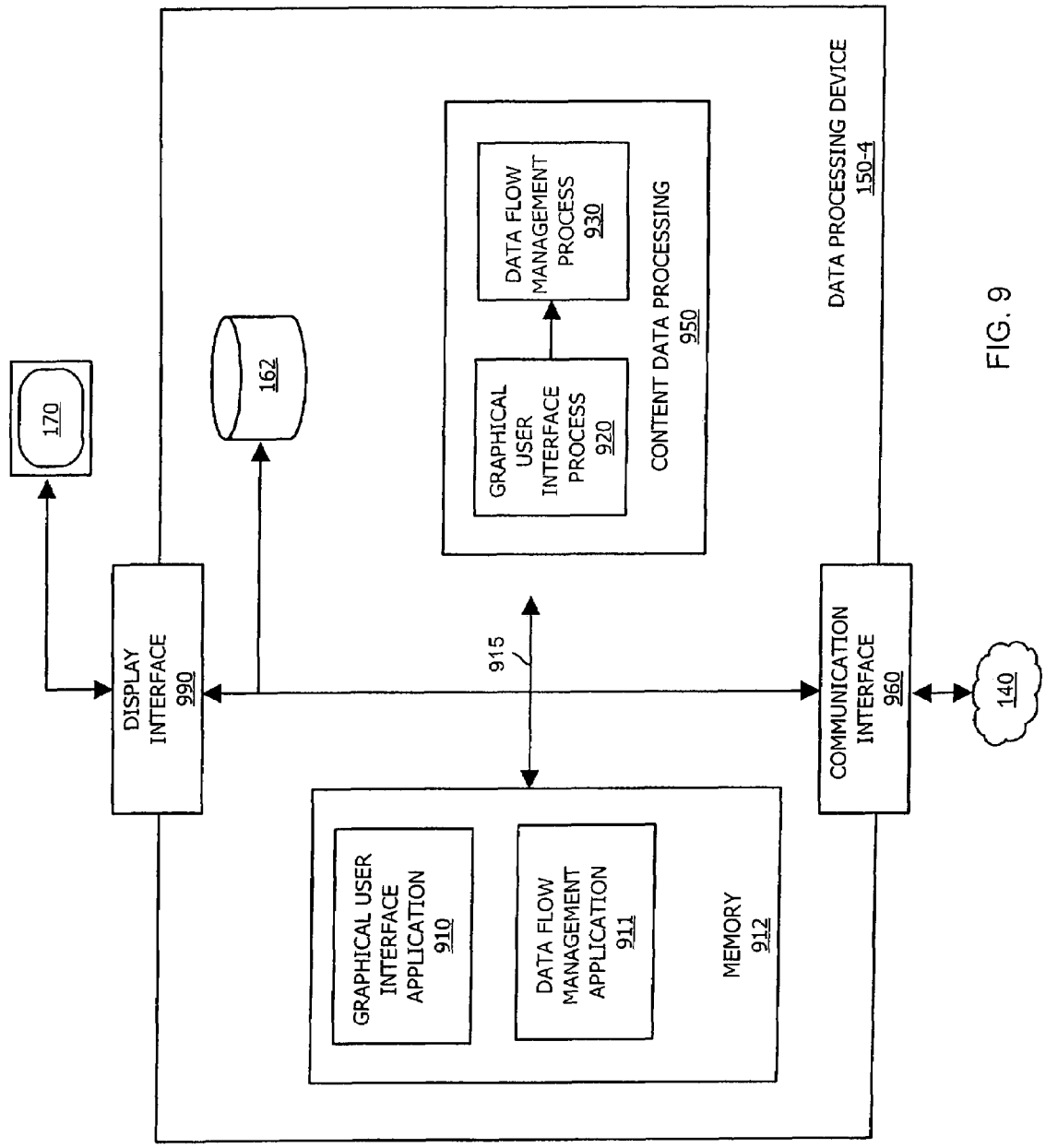
FIG. 9 is a block diagram of a device suitable for executing methods (e.g., flowcharts) and other recited techniques according to an embodiment of the invention.

FIG. 9 is a block diagram of data processing device 150-4 suitable for executing methods (e.g., flowcharts) and other recited techniques according to an embodiment of the invention. As shown, data processing device 150-4 is a computerized device including interconnect 915 such as a data bus or other circuitry interconnecting memory 912 (e.g., a memory unit such as Random Access Memory (RAM), Read-Only Memory (ROM), or other electronic memory, disk memory such as a hard disk, floppy disk, optical disk and so forth), processor 913, communication interface 960, and display interface 990. In general, processor 913 operates to manage communications with user 120, storage/retrieval of data to/from storage device 162, control of display 170, etc. as previously discussed.

Processor 913 may be any type of central processing unit, microprocessor, processing device, controller of other electronic circuitry capable of accessing graphical user interface application 910 (enabling user 120 to control functional aspects of data processing device 150-4) and data flow management application 911 (for managing flows of content data 132 transmitted over network 140 to storage device 162, flows from storage device 162 to display 170, interactions of user 120 with request processor 110, etc.) stored in memory 912.

Graphical user interface application 910 and data flow management application 911 in memory 912 represent software code, data and/or logic instructions executed by processor 913. When processor 913 executes such code, processor 913 creates graphical user interface process 920 and data flow management process 930 according to embodiments of the invention as explained herein. Details of these processes were previously discussed with respect to FIGS. 1-8.

Request processor 110 may include similar components as data processing device 150-4 to support corresponding functionality described in FIGS. 1-8.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a data processing device, a method supporting access to stored information, the method comprising:
    receiving user-selected content data from a remote source over a network in response to a user initiated content data selection;
    storing the user-selected content data in a storage location associated with the data processing device;
    enabling access to a first portion of the received user-selected content data in the storage location for selective retrieval, while disabling access to a second portion of the received user-selected content data in the storage location;
    generating a graphical user interface for displaying an itemized list of accessible user-selected content data in the storage location, the accessible user-selected content data being selectively retrieved by a user for playback in real-time;
    receiving input from the user identifying a de-selected content item in the itemized list of available content data;

disabling user access to user-selected content data in the storage location associated with the de-selected content item; and enabling user access to a different portion of user-selected content data in the storage location previously inaccessible to the user;

wherein the first portion of the received user-selected content data includes a first playable work corresponding to a first user-selection and the second portion of the received user-selected content data contains a second playable work corresponding to a second user-selection, the first and second playable works being distinct; and wherein disabling access to the second portion comprises forbidding a user from playing the second playable work, the second playable work otherwise being in a condition suitable to be played.

2. A method as in claim 1 further comprising:
providing notification to a user of only the portion of user-selected content data in the storage location that is available to the user for retrieval.

3. A method as in claim 1, wherein receiving user-selected content data from the remote source includes receiving the user-selected content data via use of a non-real-time data communication protocol, the method further comprising:
in response to receipt of a user playback command, transmitting a stream of data associated with the user-selected content data in the storage location to a playback device via use of a real-time data communication protocol.

4. A method as in claim 1 further comprising:
receiving an indication that the user re-selects access to the de-selected content item in lieu of the different portion of user-selected content data in the storage location; and
enabling user access to the de-selected content item in lieu of the different portion of user-selected content data in the storage location.

5. A method as in claim 1 further comprising:
receiving selection information from a user identifying particular content data for retrieval from the remote source; and
forwarding the selection information over the network to a request processor that collects requests for content data from multiple users, the request processor prompting distribution of content data from the remote source to the storage location accessible by the user.

6. A method as in claim 5 further comprising:
receiving input from the user specifying a time constraint for receiving the user-selected content data from the remote source for storage in the storage location; and
receiving the user-selected content data over the network for storage in the storage location depending on the specified time constraint.

7. A method as in claim 1 further comprising:
receiving input from the user specifying a bandwidth constraint for receiving user-selected content data over the network from the remote source for storage in the storage location; and
limiting a network bandwidth allocated for transmission of the user-selected content data from the remote source over the network depending on the specified bandwidth constraint.

8. A method as in claim 1 further comprising:
providing a time limit in which the user may selectively retrieve the user-selected content data from the storage location.

9. In a data processing device, a method supporting access to stored information, the method comprising:
receiving user-selected content data from a remote source over a network in response to a user initiated content data selection;
storing the user-selected content data in a storage location associated with the data processing device; and
enabling access to a first portion of the received user-selected content data in the storage location for selective retrieval, while disabling access to a second portion of the received user-selected content data in the storage location;
wherein the first portion of the received user-selected content data includes a first playable work corresponding to a first user-selection and the second portion of the received user-selected content data contains a second playable work corresponding to a second user-selection, the first and second playable works being distinct;
wherein disabling access to the second portion comprises forbidding a user from playing the second playable work, the second playable work otherwise being in a condition suitable to be played; and
wherein receiving user-selected content data from the remote source includes receiving at least a portion of the user-selected content data via use of a non-real-time data communication protocol, the method further comprising:
in response to receipt of a user playback command, transmitting a data stream based on the user-selected content data stored in the storage location to a playback device via use of a real-time data communication protocol;
detecting that a contiguous portion of data associated with the data stream is not stored in the storage location; and
transmitting the contiguous portion of data associated with the data stream to the playback device via use of a real-time data communication protocol from the remote source instead of from the storage location in order to play back uninterrupted content data.

10. In a data processing device, a method supporting access to stored information, the method comprising:
receiving user-selected content data from a remote source over a network in response to a user initiated content data selection;
storing the user-selected content data in a storage location associated with the data processing device;
enabling access to a first portion of the received user-selected content data in the storage location for selective retrieval, while disabling access to a second portion of the received user-selected content data in the storage location;
generating a graphical user interface for displaying an itemized list identifying locally available user-selected content data in the storage location accessible by a user for playback;
receiving a signal indicating that a first content data item identified in the itemized list of available user-selected content data has been retrieved by the user; and
deleting an entry corresponding to the first content data from the itemized list of available user-selected content after a configurable delay so that the user can no longer access the first content data;
wherein the first portion of the received user-selected content data includes a first playable work corresponding to a first user-selection and the second portion of the received user-selected content data contains a second playable work corresponding to a second user-selection, the first and second playable works being distinct;
wherein disabling access to the second portion comprises forbidding a user from playing the second playable work, the second playable work otherwise being in a condition suitable to be played.

11. A method as in claim 10 further comprising:
in response to making the first content data no longer available to the user, including an entry in the itemized list of available user-selected content data enabling access to second content data in the storage location previously inaccessible to the user.

12. In a data processing device, a method supporting access to stored information, the method comprising:
receiving user-selected content data from a remote source over a network in response to a user initiated content data selection;
storing the user-selected content data in a storage location associated with the data processing device; and
enabling access to a first portion of the received user-selected content data in the storage location for selective retrieval, while disabling access to a second portion of the received user-selected content data in the storage location;
the method further comprising:
partitioning a local data storage device associated with a user to include multiple storage slots for storing the first portion of user-selected content data accessible to the user for playback and at least one storage slot for storing the second portion of user-selected content data inaccessible to the user; and
based on a selection input from the user, enabling the user to access user-selected content data in the at least one slot storing the second portion of user-selected content data in lieu of enabling the user to access user-selected content data in at least one of the multiple storage slots storing the first portion of user-selected content data.

13. A data processing device providing access to stored data, the data processing device including:
a processor;
a memory unit that stores instructions associated with an application executed by the processor;
a communication interface that supports communication over a network; and
an interconnect coupling the processor, the memory unit, and the communication interface, enabling the processor to execute the application and perform operations of:
receiving user-selected content data from a remote source over the network in response to a user initiated content data selection;
storing the user-selected content data in a storage location associated with the data processing device;
enabling access to a first portion of the received user-selected content data in the storage location for selective retrieval, while disabling access to a second portion of the received user-selected content data in the storage location;
generating a graphical user interface for displaying an itemized list of accessible user-selected content data in the storage location, the accessible user-selected content data being selectively retrieved by a user for playback in real-time;
receiving input from the user identifying a de-selected content item in the itemized list of available content data;
disabling user access to user-selected content data in the storage location associated with the de-selected content item; and
enabling user access to a different portion of user-selected content data in the storage location previously inaccessible to the user;
wherein the first portion of the received user-selected content data includes a first playable work corresponding to a first user-selection and the second portion of the received user-selected content data contains a second playable work corresponding to a second user-selection, the first and second playable works being distinct; and
wherein disabling access to the second portion comprises forbidding a user from playing the second playable work, the second playable work otherwise being in a condition suitable to be played.

14. A data processing device as in claim 13 that additionally performs operations of:
providing notification to a user of only the portion of user-selected content data in the storage location that is available to the user for retrieval.

15. A data processing device as in claim 13, wherein receiving user-selected content data from the remote source involves receiving the user-selected content data via use of a non-real-time data communication protocol, the data processing device additionally performing operations of:
in response to receipt of a user playback command, transmitting a stream of data associated with the user-selected content data in the storage location to a playback device via use of a real-time data communication protocol.

16. A data processing device as in claim 13 that additionally performs operations of:
receiving an indication that the user re-selects access to the de-selected content item in lieu of the different portion of user-selected content data in the storage location; and
enabling user access to the de-selected content item in lieu of the different portion of user-selected content data in the storage location.

17. A data processing device as in claim 13 that additionally performs operations of:
receiving selection information from a user identifying particular content data for retrieval from the remote source; and
forwarding the selection information over the network to a request processor that collects requests for content data from multiple users, the request processor prompting distribution of content data from the remote source to the storage location accessible by the user.

18. A data processing device as in claim 17 that additionally performs operations of:
receiving input from the user specifying a time constraint for receiving user-selected content data from the remote source for storage in the storage location; and
enabling user access to content data in the storage location depending on the specified time for receiving the user-selected content data.

19. A data processing device as in claim 13 that additionally performs operations of:
receiving input from the user specifying a bandwidth constraint for receiving user-selected content data over the network from the remote source for storage in the storage location; and
limiting a network bandwidth allocated for transmission of the user-selected content data from the remote source over the network depending on the specified bandwidth constraint for receiving the user-selected content data.

20. A data processing device as in claim 13 that additionally performs an operation of:
providing a time limit in which the user may selectively retrieve user selected content data from the storage location.

21. A data processing device providing access to stored data, the data processing device including:
a processor;
a memory unit that stores instructions associated with an application executed by the processor;
a communication interface that supports communication over a network; and
an interconnect coupling the processor, the memory unit, and the communication interface, enabling the processor to execute the application and perform operations of:
receiving user-selected content data from a remote source over the network in response to a user initiated content data selection;
storing the user-selected content data in a storage location associated with the data processing device; and
enabling access to a first portion of the received user-selected content data in the storage location for selective retrieval, while disabling access to a second portion of the received user-selected content data in the storage location;
wherein the first portion of the received user-selected content data includes a first playable work corresponding to a first user-selection and the second portion of the received user-selected content data contains a second playable work corresponding to a second user-selection, the first and second playable works being distinct;
wherein disabling access to the second portion comprises forbidding a user from playing the second playable work, the second playable work otherwise being in a condition suitable to be played; and
wherein receiving user-selected content data from the remote source includes receiving at least a portion of the user-selected content data via use of a non-real-time data communication protocol, the data processing device additionally performing operations of:
in response to receipt of a user playback command, transmitting a data stream based on the user-selected content data stored in the storage location to a playback device via use of a real-time data communication protocol;
detecting that a contiguous portion of data associated with the data stream is not stored in the storage location; and
transmitting the contiguous portion of data associated with the data stream to the playback device via use of a real-time data communication protocol from the remote source instead of from the storage location in order to play back uninterrupted data on the playback device.

22. A data processing device providing access to stored data, the data processing device including:
a processor;
a memory unit that stores instructions associated with an application executed by the processor;
a communication interface that supports communication over a network; and
an interconnect coupling the processor, the memory unit, and the communication interface, enabling the processor to execute the application and perform operations of:
receiving user-selected content data from a remote source over the network in response to a user initiated content data selection;
storing the user-selected content data in a storage location associated with the data processing device;
enabling access to a first portion of the received user-selected content data in the storage location for selective retrieval, while disabling access to a second portion of the received user-selected content data in the storage location;
generating a graphical user interface for displaying an itemized list identifying locally available user-selected content data in the storage location accessible by a user for playback;
receiving a signal indicating that a first content data item identified in the itemized list of available user-selected content data has been retrieved by the user; and
deleting an entry corresponding to the first content data from the itemized list of available user-selected content so that the user can no longer access the first content data;
wherein the first portion of the received user-selected content data includes a first playable work corresponding to a first user-selection and the second portion of the received user-selected content data contains a second playable work corresponding to a second user-selection, the first and second playable works being distinct; and
wherein disabling access to the second portion comprises forbidding a user from playing the second playable work, the second playable work otherwise being in a condition suitable to be played.

23. A data processing device as in claim 22 that additionally performs an operation of:
in response to making the first content data no longer available to the user, including an entry in the itemized list of available user-selected content data enabling access to second content data in the storage location previously inaccessible to the user.

24. A data processing device providing access to stored data, the data processing device including:
a processor;
a memory unit that stores instructions associated with an application executed by the processor;
a communication interface that supports communication over a network; and
an interconnect coupling the processor, the memory unit, and the communication interface, enabling the processor to execute the application and perform operations of:
receiving user-selected content data from a remote source over the network in response to a user initiated content data selection;
storing the user-selected content data in a storage location associated with the data processing device; and
enabling access to a first portion of the received user-selected content data in the storage location for selective retrieval, while disabling access to a second portion of the received user-selected content data in the storage location;

wherein the data processing device additionally performs operations of:

partitioning a local data storage device associated with a user to include multiple storage slots for storing the first portion of user-selected content data accessible to the user for playback and at least one storage slot for storing the second portion of user-selected content data inaccessible to the user, each storage slot being used to at least partially store content data; and based on a selection input from the user, enabling the user to access user-selected content data in the at least one slot storing the second portion of user-selected content data in lieu of enabling the user to access user-selected content data in at least one of the multiple storage slots storing the first portion of user-selected content data.

25. A computer program product including a computer-readable medium having instructions stored thereon for processing data information, such that the instructions, when carried out by a processing device, enable the processing device to perform the steps of:

receiving user-selected content data from a remote source over a network in response to a user initiated content data selection;

storing the content data in a storage location associated with the data processing device;

enabling access to a first portion of the received user-selected content data in the storage location for selective retrieval, while disabling access to a second portion of the received user-selected content data in the storage location;

generating a graphical user interface for displaying an itemized list of accessible user-selected content data in the storage location, the accessible user-selected content data being selectively retrieved by a user for playback in real-time;

receiving input from the user identifying a de-selected content item in the itemized list of available content data;

disabling user access to user-selected content data in the storage location associated with the de-selected content item; and enabling user access to a different portion of user-selected content data in the storage location previously inaccessible to the user;

wherein the first portion of the received user-selected content data includes a first playable work corresponding to a first user-selection and the second portion of the received user-selected content data contains a second playable work corresponding to a second user-selection, the first and second playable works being distinct; and wherein disabling access to the second portion comprises forbidding a user from playing the second playable work, the second playable work otherwise being in a condition suitable to be played.

* * * * *